May 20, 1958 S. W. LICHTMAN ET AL 2,835,883

PULSE MULTIPLEX COMMUNICATION SYSTEM

Filed Dec. 29, 1948 5 Sheets-Sheet 1

INVENTORS
SAMUEL W. LICHTMAN
DANIEL G. MAZUR

BY M. A. Hayes

ATTORNEY

PULSE MULTIPLEX COMMUNICATION SYSTEM

Filed Dec. 29, 1948 5 Sheets-Sheet 2

INVENTORS
SAMUEL W. LICHTMAN
DANIEL G. MAZUR
BY M. D. Hayes
ATTORNEY

PULSE MULTIPLEX COMMUNICATION SYSTEM

Filed Dec. 29, 1948 5 Sheets-Sheet 3

INVENTORS
SAMUEL W. LICHTMAN
DANIEL G. MAZUR
BY
M. O. Hayes
ATTORNEY

PULSE MULTIPLEX COMMUNICATION SYSTEM

Filed Dec. 29, 1948 5 Sheets-Sheet 4

INVENTORS
SAMUEL W. LICHTMAN
DANIEL G. MAZUR
BY [signature]
ATTORNEY

PULSE MULTIPLEX COMMUNICATION SYSTEM

Filed Dec. 29, 1948 5 Sheets-Sheet 5

INVENTORS
SAMUEL W. LICHTMAN
DANIEL G. MAZUR
BY M. A. Hayes
ATTORNEY 2,835,883

PULSE MULTIPLEX COMMUNICATION SYSTEM

Samuel W. Lichtman and Daniel G. Mazur, Washington, D. C.

Application December 29, 1948, Serial No. 67,904

14 Claims. (Cl. 340—183)

(Granted under Title 35, U. S. Code (1952), sec. 266)

This invention relates in general to a pulse multiplex communication system wherein each individual intelligence quantity to be transmitted is represented by a corresponding time modulated pulse in a periodically recurring series.

In particular the invention relates to a time modulated pulse multiplex receiving system to be employed in conjunction with a signal generating system such as that disclosed in the co-pending application of C. H. Hoeppner, Serial No. 708,857, filed November 14, 1946, now U. S. Patent No. 2,457,819. Briefly, there is employed in the system disclosed by C. H. Hoeppner, a series of fixed equally spaced time reference markers interleaved with a series of independent channel information pulses. Intelligence is conveyed by modulating the time spacing between each individual channel information pulse and its corresponding time reference marker. In the present system the time reference markers are suppressed during transmission and suitable synchronizing pulses are emitted from one channel of the transmitter once during each series of intelligence pulses. The synchronizing pulses are provided with an identifying characteristic distinct from the intelligence conveying pulses and are readily separated therefrom.

At the receiver, the synchronizing pulses are separated from the intelligence pulses and are used to correct the phase and frequency of a reference oscillator which is employed for reestablishing the time reference markers suppressed at the transmitter. This step is essential for correctly receiving the time modulated pulses and for accurately determining the intelligence conveyed by the time variation of the individual channel pulses from their corresponding time reference marker.

It is accordingly an object of the present invention to provide a new and improved pulse type multiplex communication system.

It is a further object of the present invention to provide, in a multiplex receiving system, a method and means for reestablishing each channel time period, from which time modulated pulses may be demodulated.

Another object of the present invention is to provide phase and frequency control of the time reference oscillator used in reestablishing each channel time period and each time reference marker in the present invention.

Another object of the present invention is to provide method and means for visually representing the time modulated pulses on a cathode ray tube indicator and means for recording the said visual presentation.

Further objects and attainments of the present invention will become apparent from the following detailed description when taken in conjunction with the accompanying drawings in which:

Fig. 6 is a block diagram of a suitable pulse forming means and counter circuits useable by the present invention;

In brief and in accordance with the spirit of the invention the multiplex receiver is designed to receive a train of multi-channel time modulated pulses. Interspersed with the intelligence pulses is a group of synchronizing pulses, occurring at definite fixed time intervals. These synchronizing pulses are separated from the time modulated intelligence pulses and are utilized in an unique manner, more fully described hereinafter, to establish in the receiving system sweep voltages for a cathode ray tube indicator and further to reestablish time reference markers analogous to those of the transmitter. It is the time relationship between the individual intelligence pulses and the corresponding time reference markers that is useful in indicating the intelligence quantities received.

To better illustrate and to more fully understand the purpose and function of the present invention it may best be described in conjunction with the transmitter system set forth in the aforementioned patent to C. H. Hoeppner. It is to be understood, however, that the present invention is not to be limited to the transmitter system referred to, moreover the present invention may be employed in conjunction with any pulse time modulated system wherein the intelligence pulse of each channel is displaced in time from a time reference marker in accordance with the intelligence conveyed.

Figure 1:
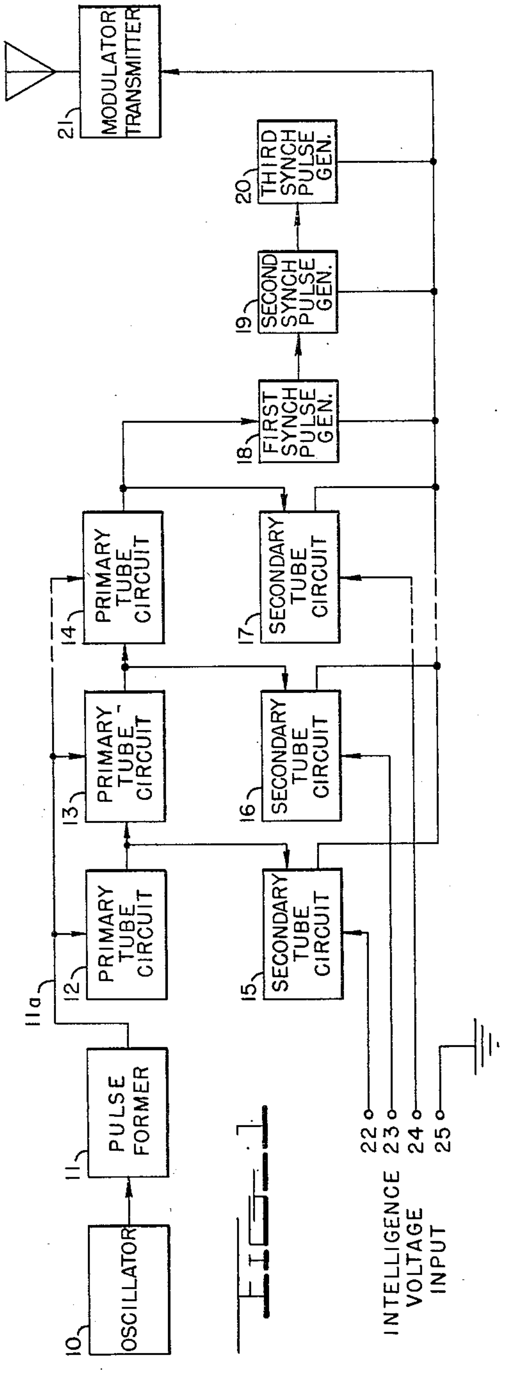
Fig. 1 is a block diagram of a suitable pulse transmitter useable by the present invention.

With reference to Fig. 1 an intelligence pulse time modulation transmitting system such as schematically disclosed by C. H. Hoeppner is shown in block with a series of explanatory wave forms shown in Fig. 2. The system is timed in operation by a sinusoidal oscillation signal generator 10. From the sinusoidal output of generator 10, illustrated at A of Fig. 2, a series of pulse type time reference signals, shown at B in Fig. 2, of short duration are derived by pulse former 11.

Figure 2:
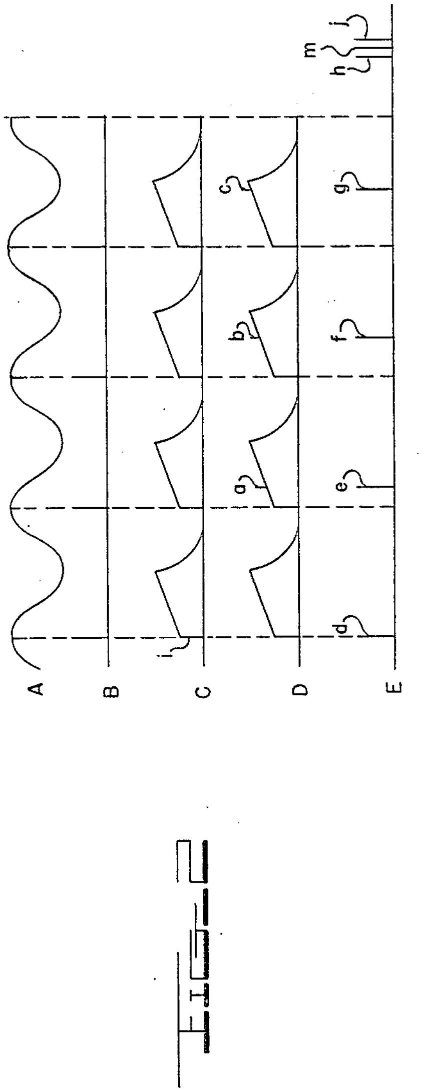
Fig. 2 is a series of wave forms added for purposes of illustrating the operation of the signal generating system.

The time reference pulses thus produced, and illustrated at B in Fig. 2 are applied simultaneously via lead 11*a* to a series of gas filled primary electron tubes 12, 13 and 14. Each of such primary tubes corresponds to a different intelligence conveying pulse channel from which successive pulses are transmitted. The number of primary tubes, of course, correspond to the number of intelligence channels desired. The first of the primary tubes 12 may be self starting and is made conductive by the injection of the first oscillator pulse from pulse former 11. The first primary tube generates upon conduction a saw-tooth wave form of the type illustrated at C, in Fig. 2. This wave form is coupled to the second primary tube 13 to render it conductive upon reception of the second oscillator pulse from pulse former 11. This same action continues with the third primary tube in series and so on until there is completed a cycle of operation through each primary tube employed in the series whereby there is thus generated a sequential series of saw-tooth voltages as illustrated by wave form C in Fig. 2. The circuit is so designed that no primary tube in the series can be made conductive unless the voltage from the previous primary tube and the oscillator pulse from pulse former 11 are simultaneously impressed thereon. This requirement produces sequential operation of the primary tube chain.

The output of each primary tube, typified at 12, is further supplied to a corresponding secondary gas filled electron tube, typified at 15. Each of the secondary tubes is normally biased to non-conduction with the bias on the secondary tubes arranged in the preferred embodiment so that each secondary tube conducts, in the absence of an intelligence signal applied thereto, at the initial vertical slope of the saw-tooth wave form, *i* of wave form C, applied thereto. This action causes a narrow pulse to be developed from the secondary tubes as illustrated by waveform E of Fig. 2.

The exact point on the saw-tooth waveform, at which the secondary tubes 15, 16 and 17 become conductive, is varied by the amplitude of a negative intelligence control voltage applied to each of the secondary tubes between terminals 22, 23, 24, respectively and ground 25. Each intelligence voltage is preferably in the form of a negative control potential applied to the appropriate control terminals 22, 23 and 24. The more negative the control potential the longer the delay between the start of the saw-tooth voltage and the initiation of conduction in the secondary tube. The time occurrence of the output voltage pulses of waveform E, with respect to the time reference markers of waveform B, is therefore governed in each channel by the instantaneous amplitude of the corresponding intelligence voltage applied to the same channel. Pulses *e*, *f* and *g* being displaced in time from the corresponding time reference markers in waveform B in accordance with the amplitude of the respective intelligence voltage. Pulse *d* is representative of the first secondary tube output wherein no intelligence voltage is applied.

To properly restore the time base (time reference markers) to determine the time displacement of the intelligence pulses with respect to the time reference markers in the receiving system, there is further transmitted with the intelligence pulses a group of synchronizing pulses. The choice of the type of synchronizing pulses is arbitrary and may be a single wide pulse such as disclosed by C. H. Hoeppner, Serial No. 709,629, filed November 13, 1946, and now U. S. Patent 2,537,056, or such as here shown for purposes of illustration, a group of three sharp synchronizing pulses. The choice of a group of three synchronizing pulses for use in the present invention has been made for reasons explained hereinafter. To generate the groups of synchronizing pulses the waveform output of the last of the series of primary tubes is coupled to a first synchronizing pulse generator 18, to render it operative. This produces the sharp output pulse *h* of waveform E of Fig. 2 and which pulse is further employed to render a second pulse generator 19 operative, producing sharp output pulse *m* time spaced from *h*. Sharp pulse *m* also is coupled to the third synchronizing generator to render it operative to produce sharp output pulse *j* time spaced from *m*. As seen in waveform E of Fig. 2 the time spacing of the synchronizing pulses is considerably less than the spacing between the intelligence pulses. This is to permit the conveyance of an intelligence pulse on the final channel of the series and for purposes of discriminating between the synchronizing pulses and the intelligence pulses, as explained hereinafter.

Synchronizing pulse generators 18, 19 and 20 may assume any conventional form such as for example a delay line with their appropriate taps taken therefrom. Alternatively, 18, 19 and 20 may each represent one multivibrator stage in a chain of three cascaded one shot multivibrators.

The outputs of all the secondary tubes, combined with the outputs of the synchronizing pulse generators, are applied to a pulse transmitter 21 wherein they are transmitted in a conventional manner.

Figures 3, 4, 4A:
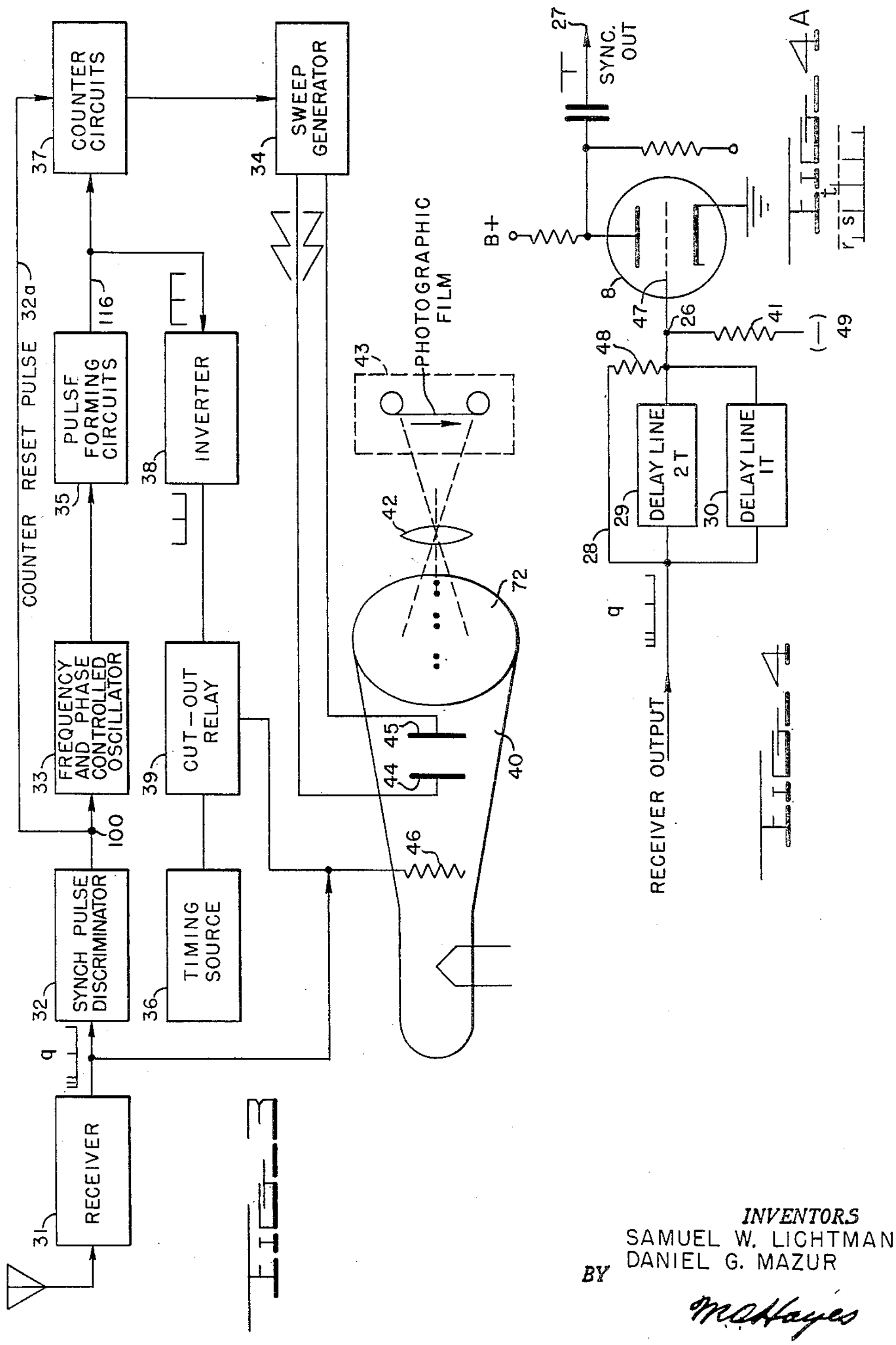
Fig. 3 is a block diagram of a receiving system for the present invention.
Fig. 4 is a schematic diagram partly in block, of a pulse discriminator as employed in the preferred embodiment of the invention.

Referring now to Fig. 3 there is illustrated one embodiment of the receiving apparatus of the present invention. The essential elements comprise a receiver 31, capable of receiving the time modulated pulses and the synchronizing pulses; a synchronization pulse discriminator 32, for extracting the synchronization pulses from the video signal and for producing a single synchronization pulse; a transition oscillator 33 for producing the time reference markers; and finally pulse forming circuits 35 for driving a counter circuit 37 operative to produce triggering pulses to initiate sweep voltages for a cathode ray tube recording indicator 40.

Receiver 31 is in itself no part of the present invention and may be of any suitable design known in the art. Receiver 31, however, should incorporate certain characteristics for rendering it suitable to the present invention. As the intelligence pulses are used directly for video recording, on the cathode ray tube 40, the receiver should provide maximum realizable signal sensitivity with minimized pulse stretching and distortion. Further the video signal output from the receiver should be of a constant amplitude for carriers exceeding a threshold level. A suggested means for obtaining this performance may be by the use of known type pulse automatic gain control circuits.

As previously mentioned receiver 31 receives with the intelligence pulses the group of synchronizing pulses, as illustrated at *q*. The intelligence pulses and the synchronizing pulses are fed to the cathode ray tube indicator 40 for display; while the synchronizing pulses are applied through discriminator 32 to the oscillator 33 to the exclusion of the intelligence pulses. The function of the synchronizing pulse discriminator 32 is, of course, to extract the synchronizing pulse from the received pulse series. The theory of operation of discriminator 32 is based on the fact that the synchronizing pulses are transmitted sequentially, whereas the time modulated pulses vary in relative position. Discriminator 32 may be of any known character capable of discriminating between pulses of multiple numbers. As an example, this may be accomplished in a manner illustrated in Fig. 4, which is a schematic diagram partly in block of a discriminator circuit with the explanatory wave forms shown in Fig. 4A. In operation of the circuit vacuum tube 8 is negatively biased at grid 47 by negative voltage source 49 applied through resistor 41, whereby conduction occurs only upon the application thereto of a pulse of sufficient opposite polarity.

Assume, for purposes of illustration, that the time spacing between each synchronizing pulse is of the order of 7.5 microseconds and that each pulse is of itself of insufficient amplitude to render the vacuum tube 8 conductive, whereas a group of three synchronizing pulses occurring at grid 47 simultaneously is of sufficient amplitude to render tube 8 conductive. The objective then of the circuit illustrated in Fig. 4 is to provide means for having the three sequential pulses occurring simultaneously at grid 47. In that the purpose of discriminator 32 is to derive a single synchronizing pulse, the circuit is designed to only permit the simultaneous occurrence of pulses having a time spacing therebetween of 7.5 microseconds.

To extract a single synchronizing pulse from the received pulses there is incorporated in the circuit shown in Fig. 4 a pair of delay lines, 1T being a 7.5 microseconds' delay and 2T being a 15 microseconds' delay, in conjunction with a direct line 28 and resistor 48. In operation, the synchronizing pulses are applied through the paths in parallel to point 26; the first path consists of direct connection 28 including resistor 48, the second and third paths consist respectively delay lines 29 and 30. The first pulse of the group of three synchronizing pulses is applied directly through direct connection 28 to point 26, as indicated at *r* in Fig. 4A and is of insufficient amplitude to render tube 8 conducting. The second pulse of the group of three is applied through lead 28 to point 26 at the instant the first pulse emerges from delay line 30. This produces the resultant pulse *s* which, although larger than pulse *r*, is still insufficient to overcome bias 49 to render tube 8 conducting. The third pulse of the group is applied over lead 28 to point 26 and appears thereat at the instant the first pulse emerges from delay line 29 and the second pulse from delay line 30. This combination of pulses produces the resultant *t* which is of sufficient amplitude to overcome bias 49 and produce an output pulse from tube 8 at point 27. The time spacing of the individual pulses in the synchronizing group is, of course, chosen so that the intelligence pulses will not by themselves produce an output from tube 8.

It is seen in the circuit just described that in order to obtain the single synchronizing pulse, there is introduced a 15 microsecond delay of the synchronizing pulse with respect to the time reference marker. This time lag must be corrected for properly restoring the time reference markers. The manner in which this is accomplished is to be described later in conjunction with the counter circuits.

The use of a group of three synchronizing pulses is desired to avoid triggering the circuit in response to a pair of time modulated pulses which might accidently have the desired time spacing. A single pulse of course would be confusing with a time modulated pulse or a time reference marker. A single pulse of greater width than the intelligence pulse may be used in place of the group of pulses but it has been found to be more expedient to use the group of three pulses due to the size of modulation transformers, etc., necessary for a single wide pulse.

The single synchronizing pulse thus produced at the output of the discriminator 32 is applied to oscillator 33 for phase and frequency aligning of the oscillator. Briefly, phase correction of the oscillator is accomplished by directly injecting the synchronizing pulse from discriminator 32 on the first grid of the oscillator tube. Frequency correction is obtained by jointly impressing part of the output signal of the oscillator and the synchronizing pulse upon a coincidence tube normally biased to cut-off. Upon the application of the synchronizing pulse the coincidence tube is rendered conducting. When the oscillator frequency of the receiver is aligned with that of the oscillator frequency of the transmitter there will exist at the plate circuit of the coincidence tube, a negative polarity voltage pulse of an amplitude in accordance with the zero axis of the sine wave. A voltage pulse of greater or less amplitude will appear at the output of the coincidence tube if the oscillator frequency is leading or lagging the synchronizing pulse. This voltage is then converted to a smooth direct voltage, in a manner described hereinafter, and applied directly to the first grid of the oscillator tube correcting its frequency by its deviated amount.

Figure 5:
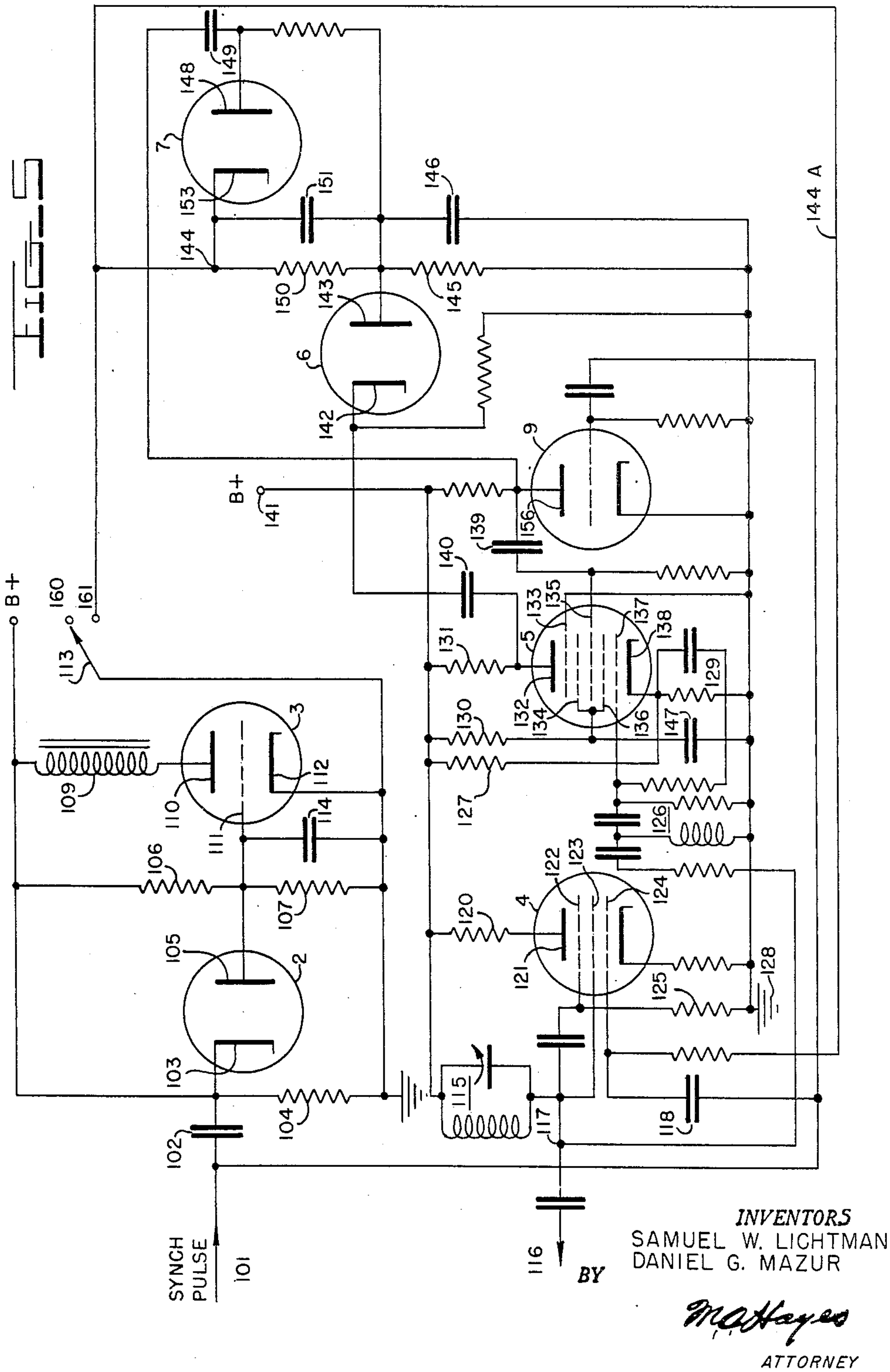
Fig. 5 is a schematic diagram of the phase and frequency controlled oscillator as employed in the receiver of the invention.
Figure 4:
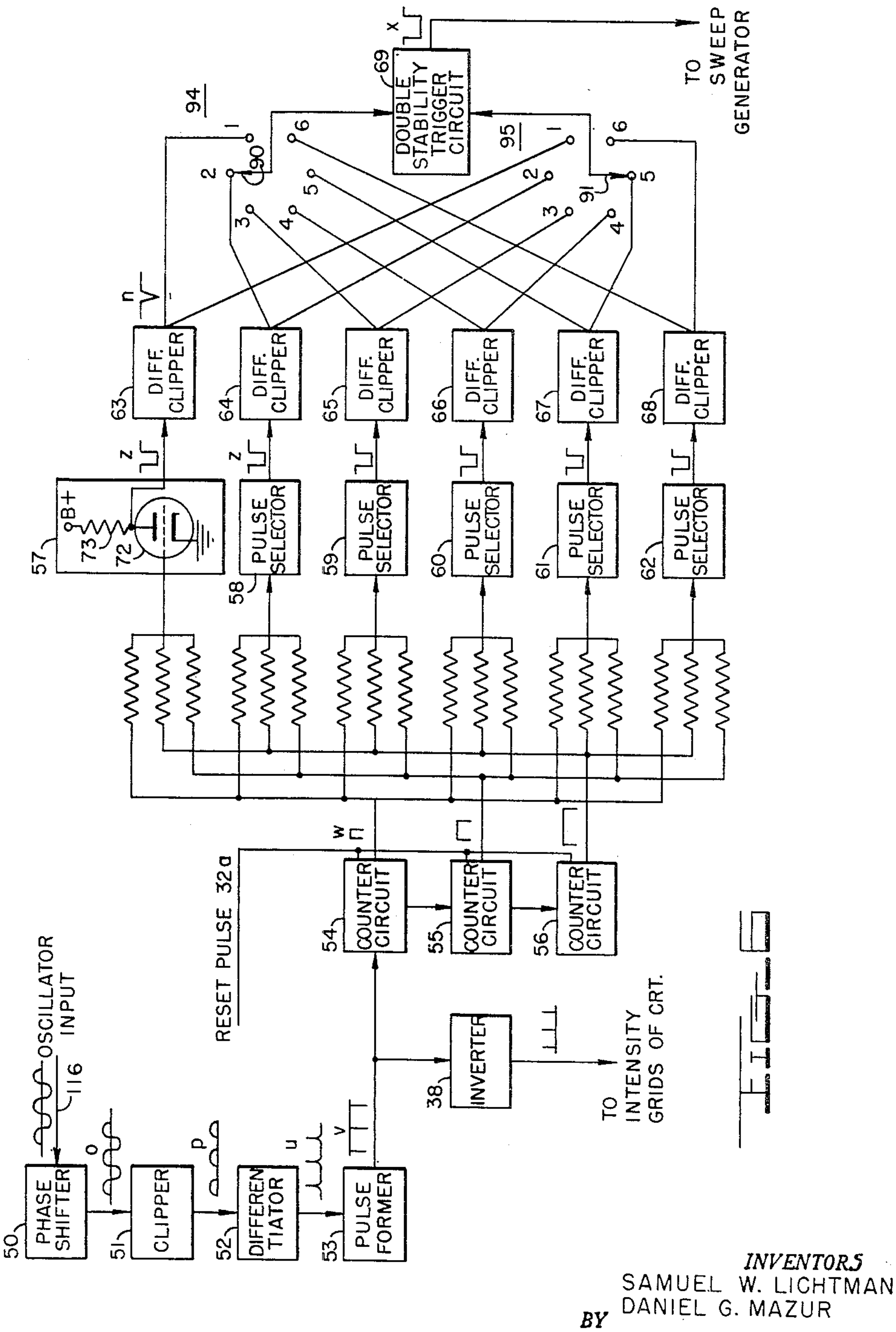

Referring more specifically to Fig. 5 there is illustrated a schematic diagram of a transitron oscillator with provisions for phase and frequency alignment. Connected to the screen grid 123 of oscillator tube 4 is resonant circuit 115, having an inductance and a variable capacitance for roughly adjusting the frequency. Lead 141 is connected through resonant circuit 115 to screen grid 123 to provide a source of operating potential therefor. The suppressor gid 122 is connected through resistor 125 to ground 128. The anode 121 is connected through load resistor 120 to the point of positive potential 141.

In operation of the oscillator circuit, phase correction, that is aligning the phase of the oscillator with that of the synchronizing pulse, is obtained by injecting the synchronizing pulses on the main grid 124 through connection 101 and coupling capacitor 118. The synchronizing pulse, which is a sub-harmonic of the oscillator frequency, aligns the oscillator in phase in accordance with the phase of the synchronizing pulse.

The circuit associated with the oscillator vacuum tube 4 is further operative for maintaining alignment of the frequency of the receiver oscillator with that of the transmitter oscillator by means of the synchronizing pulse. This is accomplished by applying a portion of the output of the oscillator sine wave appearing at point 117 through a phase shifter 126 to grid 137 of vacuum tube 5. Phase shifter 126 can be of any type known in the art and functions to shift the sine wave output of the oscillator 90°. The phase shift is necessary since the sine wave is sampled at the positive crest when the oscillator is on the correct frequency. It is therefore necessary to shift the sine wave 90° to its zero axis point to obtain a positive or negative correction voltage for adjusting the frequency of the oscillator as described hereinafter. Vacuum tube 5 is a coincidence tube which is biased to plate current cut-off by resistance-capacitance circuit 129 and bleeder resistor 127. Anode 132 of coincidence tube 5 is connected to a point of positive potential 141 through load resistor 131. Grids 134 and 136 are tied together and connected to a point of positive potential 141 of a direct current source through a voltage reducing resistor 130 whose lower end is bypassed to ground by a suitable condenser 147. These positive grids function as a screen grid for the intermediate grid 135. The fifth grid 133 of the tube is connected directly to ground and functions as a suppressor grid.

The synchronizing signal is applied as a postiive pulse to grid 135 of coincidence tube 5 through a vacuum tube inverter circuit 9. Coincidence tube 5 is thus made conducting whenever the synchronizing pulse appears. The amount of conduction variation is dependent upon the instantaneous amplitude of the sine wave impressed on grid 137. When the oscillator is operating at the correct frequency the zero voltage point of the sine wave is sampled by the synchronizing pulse. In this condition the oscillator is exactly on the same frequency as its equivalent in the transmitter.

A negative pulse is developed across the plate resistor 131 of the coincidence tube 5 corresponding in amplitude to the instantaneous amplitude of the sine wave value at the instant of sampling.

The negative pulse output of coincidence tube 5 is applied to an integrating vacuum tube circuit 6 operable in conjunction with a second integrating tube circuit 7. These two integrating circuits are so designed that their respective outputs are in opposition to each other, wherein a voltage output therefrom, as will be described, will be in accordance with the frequency deviation of the oscillator. In operation of the integrating circuits the negative pulse output of coincidence tube 5 is applied to the cathode 142 of integrator tube 6 where the voltage pulses are rectified and converted by resistor 145 and condenser 146 to a smooth negative polarity direct current voltage. There is applied directly to the anode 148 of integrator 7, from anode 156 of inverter tube 9 through coupling capacitor 149, the positive polarity synchronizing pulse. The synchronizing pulse is also rectified and converted by resistor 150 and capacitor 151 to a smooth positive polarity direct current potential. The two integrator circuits are as previously mentioned, so arranged that their respective outputs are in opposition to each other, to produce thereby a differential voltage. When the oscillator frequency is in synchronism with that of the synchronizing pulse at the time of sampling the outputs of the two integrators will cancel and a zero voltage will appear at point 144. When the oscillator frequency of the receiver is lower, for example than that of the oscillator frequency of the transmitter, at the time of sampling the negative voltage output from anode 143 of integrator tube 6 will be greater than the positive voltage output from cathode 153 of integrator tube 7 thereby producing a negative polarity voltage output at point 144. The reverse situation follows when the oscillator frequency of the receiver is higher than that of the transmitter oscillator at the instant of sampling thereby giving a positive voltage at point 144. The differential voltage from point 144 of integrator tube 6 and 7 is then applied via lead 144A as control bias to the main grid 124 of the oscillator vacuum tube 4 whereby automatic control of its frequency is maintained.

The above described automatic frequency control is effective so long as the synchronizing signal is present. With synchronizing signal fade-out however, there would be the danger of lock-in on the wrong oscillator harmonic when the signal returns. To prevent locking-in on a wrong harmonic, there is incorporated in the preferred embodiment a cut-out relay circuit. Briefly this relay circuit removes the automatic frequency control voltage by grounding the automatic frequency control lead 144A when there is signal fade-out.

Referring again to Fig. 5 there is shown a cut-out relay circuit operable in conjunction with the previously disclosed, frequency and phase controlled oscillator. The negative synchronizing pulse (obtained from the plate of tube 8, Fig. 4) is applied from point 101 to the cathode 103 of a vacuum tube integrator 2 through a blocking condenser 102 where the synchronizing pulses are integrated by resistor 107 and condenser 114 and placed as negative bias to the grid 111 of vacuum tube 3. Vacuum tube 3 has a relay coil 109 in its plate circuit 110. Thusly the continuously received synchronizing pulse operates to render vacuum tube 3 non-conducting. With signal fade-out there consequently is no cut-off bias applied to vacuum tube 3. With the removal of bias, vacuum tube 3 is rendered conducting, energizing relay 109 which grounds tap 161 to grounded contact arm 113, grounding out the automatic frequency control voltage to the oscillator tube 4. This permits oscillator tube 4 to run freely. It is to be understood that electronic means, such as an RC time constant circuit may be employed in place of the relay coil illustrated. Time constants for the cut-out relay circuit have been empirically chosen so that automatic frequency voltage is applied to the oscillator 4 a predetermined time after application of the carrier signal and is removed after a predetermined time following carrier fade-out. This is done to permit the synchronizing pulse to be injected to the oscillator for phase control before the correction voltage is applied to the oscillator for frequency control.

Referring again to Fig. 3, the sine wave voltage output of the frequency and phase controlled oscillator is formed into time reference pulses by means of pulse forming circuits 35 and counter circuits 37. The time reference pulses have a two-fold purpose, as previously mentioned; for reestablishing the time reference markers and for initiating the cathode ray tube indicator sweeps.

An example of counter circuits, suitable for use in this invention is shown in United States patent to C. H. Smith et al., No. 2,409,299, except for modifications later described.

Referring to Fig. 6 of the present invention there is shown a block diagram illustrating the counter circuits as taught by C. H. Smith et al., supra with the modifications thereof, in conjunction with conventional pulse forming circuits. The sine wave voltage output 116 of the frequency and phase controlled oscillator 33 of Fig. 3 is first shifted in phase by means of a phase shifter 50, for recovering the 15 microsecond time delay lost through the synchronizing pulse discriminator 32 of Fig. 3 as previously explained. The phase corrected sine wave voltage $o$ is fed to a clipper circuit 51 giving a clipped output $p$ which is fed to differentiator 52. The differentiator output $u$ is then formed into pulses by means of pulse former 53 to give negative sharp pulses $v$ which coincide exactly in time to the time reference markers in the transmitter. These negative sharp pulses $v$ are used to drive a chain of scale-of-two counter circuits 54, 55 and 56, in accordance with the teachings of and corresponding to the stages 11, 12 and 13 of the Smith et al. patent.

Counter stages 54, 55 and 56 in turn operate to render pulse selector tubes 57, 58, 59, 60, 61, and 62 conducting in sequence, corresponding to tubes 14, 15, etc. of the Smith et al. application. The operation of the counter circuits is in essence in accordance with the teachings of Smith et al. patent, except that each of the pulse selector tubes 57 through 62 is provided with a separate plate load resistor 73, as shown in the typical pulse selector circuit 57, whereby a sequence of pulses Z are obtained from the tubes of the pulse selector chain.

A further addition employed in the preferred embodiment, over that shown in the Smith et al. patent, is that the counter stages are reset after each series of conduction. A reset pulse, which is the synchronizing pulse, is applied over reset lines $32a$ as a negative pulse of the suppressor grids of one tube to each counter stage which returns the tubes to a non-conductive state. This permits the chain of counters to conduct in rotative order in accordance with their representative channel.

Each of the rectangular pulses $z$ is equal in duration to the time spacing between two sequential time reference markers at the transmitter, which is the channel transmission time period. For example, the pulse output $z$ from pulse selector 57 corresponds to the time interval between the first and second time reference pulses; the pulse output from selector 58 corresponds to the time interval between the second and third time reference pulse and so on. The trailing edge of each of the rectangular pulses $z$ coincides exactly in time with that of a time reference marker. The rectangular pulses $z$ from the pulse selectors are differentiated and clipped in differentiator circuits 63 through 68 giving separate sequential outputs $n$, that coincide in time with the corresponding time reference markers. The number of stages in the counter and the number of pulse selectors are of course chosen to equal the number of channels provided at the transmitter and it is seen that the number of these circuits may readily be decreased or increased in accordance with the number of said channels. Each of the differentiated outputs $n$ is respectively fed to contact points 1 through 6 on each of the two switches 94 and 95. Switches 94 and 95 are for purposes of illustration, and may be any other type of contact points, such as pin jacks or similar tie points from which the outputs $n$ may be coupled for purposes now to be explained.

One of the primary objects of the present invention is to display the time modulated pulses with their corresponding time reference markers, on a cathode ray tube indicator where the visual display may be photographically recorded as later explained. It is understood that there may be employed in the system a cathode ray tube indicator for each channel of time modulated pulses by coupling each channel output pulse to a separate sweep circuit and cathode ray tube indicator. It has been found, however, to be unnecessary as well as expensive to display each channel individually. The present invention illustrates means whereby the entire series of channels may be given on one or more cathode ray tube indicators. Displaying more than one channel at a time on a single cathode ray indicator tube may be accomplished by making the sweep length on the cathode ray indicator analogous to the time of the group of channels, desired to be displayed, rather than a single channel.

To make the sweep length on the cathode ray tube indicator analogous in time to a group of time modulated pulse channels there is incorporated in the present invention in conjunction with switches 94 and 95 a double stability trigger circuit 69. Double stability trigger circuit 69 may be, as employed in the preferred embodiment, a conventional Eccles-Jordan circuit where its period of conduction is controlled by a pair of pulses, the first pulse to render the circuit operative and the second pulse to render the circuit inoperative. There is thusly obtained from circuit 69 a negative pulse output *x*, of a duration equal to the time spacing between the pair of pulses.

In operation of the cathode ray indicator in conjunction with the switches 94 and 95 each of the output pulses *n* from the differentiator-clipper circuits is fed to a separate contact of the two switches 94 and 95, as illustrated. Assume for purposes of illustration that there are six channels, the first channel represented by differentiator clipper 63, the second channel represented by differentiator clipper 64 and so on down, and it is desired to display on the cathode ray indicator three channels, say for instance channels 2, 3 and 4. Switch rotor arm 90 of switch 94 is turned to contact 2, which is coupled to the second channel or differentiator-clipper 64. The output pulse *n* from differentiator-clipper 64 renders the double stability circuit 69 operative. Switch rotor arm 91 of switch 95 is turned to contact 5 which is coupled to channel 5 or differentiator-clipper circuit 67 where its output pulse *n* renders the double stability circuit 69 inoperative. It is seen then that the period of conduction of the double stability trigger circuit 69, and hence the time duration of its output pulse *x* is equivalent to the time period of channels 2, 3 and 4, it being remembered that the output pulses *n* coincide with the time reference markers, or the beginning of the channel time period, therefore making it necessary to employ the fifth channel pulse to end the period of conduction of the double stability trigger circuit 69.

The voltage output *x* from the double stability trigger circuit 69 of Fig. 6 is applied as control voltage to sweep generator 34 of Fig. 3 to which reference again may be had. Sweep generator 34 is a conventional generator known to those skilled in the art to furnish a push-pull saw-tooth deflection wave, of a duration equal to the control voltage applied thereto. The saw-tooth sweep is coupled to the horizontal plates 44 and 45 of the recording cathode ray indicator tube 40 of Fig. 3. It is thusly seen that each sweep is initiated through the double stability trigger circuit 69 simultaneously with the initiation of the time period of a particular intelligence channel and is of a duration equal to the time period of the desired group of channels, giving on the cathode ray tube indicator 40 of Fig. 3 a sweep length corresponding in time to the desired number of pulse channels of reception.

With the sweep on the cathode ray tube recording indicator representing the group of channels there is further presented, in its proper position on the sweep, each channel time reference marker of the particular channels represented. These time reference markers are restored, on the cathode ray tube indicator, by impressing on the intensity grid 46 of cathode ray tube indicator 40 the counter circuits drive pulses, from pulse former 35 after inversion in the inverter 38. Each pulse intensifies a spot on the cathode ray tube indicator sweep in a position in accordance with its particular pulse channel, analogous to the time reference markers at the transmitter.

To display on the cathode ray indicator the time modulated pulses in its proper time relationship to its corresponding time reference marker, in accordance with the intelligence conveyed, the intelligence pulses, after proper amplification, are also impressed on the intensity grid 46. Each intelligence conveying time modulated pulse intensifies a spot, in its respective time position to its corresponding time reference marker, on the cathode ray tube screen in the same manner as the time reference markers. With reference to the screen 72 of cathode ray tube indicator 40 of Fig. 3, there appears thereon a series of spots, a pair of spots representing each channel of reception. The first spot, and alternate spots thereafter represent the equally time spaced channel time reference markers. The second spot represents the time modulated intelligence conveying pulses of the first channel. The fourth spot represents the intelligence conveying time modulated pulses of the second channel and so on. The intelligence pulses vary in position with respect to their time reference markers, in accordance with the intelligence conveyed.

Figure 8:
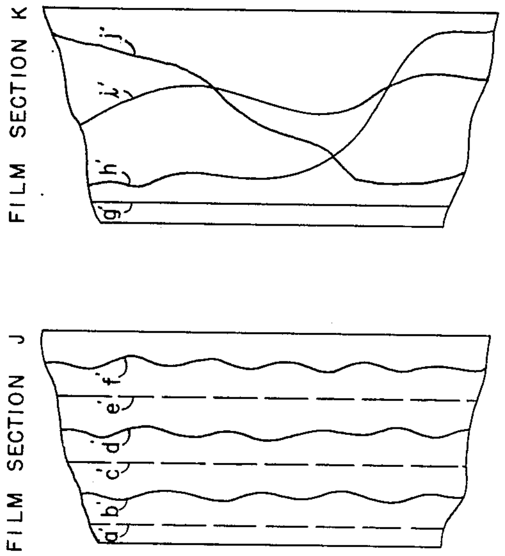
Fig. 8 is a pair of film sections illustrating the cathode ray tube indicator presentations.

To illustrate the time position variation of the intelligence conveying time modulated pulses with respect to its particular time reference markers, reference may be had for the moment to J of Fig. 8 which shows a section of recorded film. The recorded film is obtained, in a manner to be described later, by recording from the cathode ray indicator screen 72 the series of dots presented thereon, and which of course will appear as a continuous series of dots. The straight vertical lines *a'*, *c'* and *e'* represent the time reference markers and adjacent thereto there is represented the time modulated pulses as curving lines. It is readily seen that the time displacement of the time modulated pulses from its corresponding time reference marker may be easily ascertained therefrom.

Figure 7:
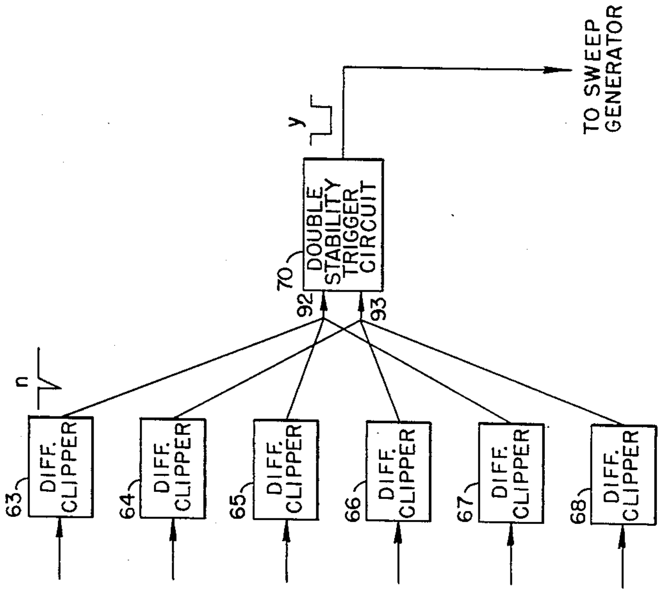
Fig. 7 is an illustration in block of an alternative embodiment for connecting the various pulse channels in the receivers to a cathode ray tube indicator.

Cathode ray tube indicator 40, as shown in Fig. 3, displays the intelligence conveying time modulated pulses and its corresponding time reference marker pulses of a group of channels, it being understood any number of channels may thusly be displayed. It is desirable at times, where a limited number of indicators are employed, that necessitates channel group displaying, to have a finer definition of the time spacing between the time modulated pulse and its corresponding time reference marker than that afforded by the manner of display as previously described. With reference to Fig. 7 there is illustrated, as a further example, another means of displaying a group of channels on a single indicator wherein the individual channel sweeps are superimposed upon one another. In this manner each individual channel of a multiple group is displayed over the entire face of the screen of the cathode indicator tube. As a means of accomplishing this objective there is coupled to the input 92 of the double stability trigger circuit 70 pulses of alternate channels, 1, 3 and 5, to render it operative. The remaining alternate pulses 2, 4 and 6 are coupled to input 93 of the double stability trigger circuit 70 to render it inoperative.

As an example of the operation of the circuit illustrated in Fig. 7 assume that it is desired to display three channels, over the entire screen of the cathode ray tube indicator simultaneously. The pulse from differentiator-clipper 63 or channel 1 is coupled to input 92 of double stability trigger circuit 70 which renders it operative. The pulse from the next succeeding channel (from differentiator clipper 64) is coupled to input 93 of double stability trigger circuit 70 which renders it inoperative. There will be produced, therefore at the output of circuit 70 a negative pulse of a time duration equal to the time duration of a single channel. The same procedure is then followed through alternate channels, the pulse of channel 3 to render circuit 70 operative and the pulse of channel 4 to render it inoperative and so on, to give at the output of circuit 70 a group of three distinct pulses *y* each of a time duration equal to the time period of a single channel. The pulse output *y* from double stability circuit 70 when coupled to the sweep circuit of a cathode ray tube indicator will therefore give a sweep of a length equal to the time period of a single channel. In that there is no vertical deflection voltage on the cathode ray indicators the individual sweeps will be superimposed one upon another.

To illustrate the finer definition of the time variation of the intelligence conveying time modulated pulses with respect to their corresponding time reference markers wherein the embodiment of Fig. 7 is employed, reference may be had for the moment to K of Fig. 8 which shows a section of recorded film on a cathode ray tube presentation, employing the embodiment of Fig. 7. The vertical line $g'$ represents the time reference marker pulses of the three channels, whereas the curving lines $h'$, $i'$ and $j'$ represent the time modulated pulses. It is seen upon observation that the intelligence conveying pulses vary in time position over the entire screen area, hence a finer definition of said variation with respect to the single time reference marker.

It is necessary in the present multiplex system, as it is in other types of systems, to have a permanent record of the information received for evaluating the intelligence as conveyed by the time modulated pulses. In the conventional systems wherein time modulated pulses are employed they are generally converted to amplitude modulated pulses and are then applied to an electrical tape recorder or to peak reading electrical meters, as examples. In the preferred embodiment of the present system the permanent record is obtained by directly photographing the spots appearing on the screen of the cathode ray indicator tube 40 and/or the display of any additional cathode ray indicator employed. Direct photographic recording of the intelligence pulses appearing as intensified spots on the screen of the cathode ray tube indicator simplifies the handling of a large number of channels, without compromising accuracy and further reduces the receiver station manipulation essential to that of tuning in the carrier which insures proper functioning of the camera equipment. This obviates the cumbersome adjustments required to maintain calibration and sensitivity settings of the individual galvonometers as has been the practice in conventional electrical recorders, and which adjustments become more complex as the number of channels is increased.

Cathode ray tube indicator 40 would normally be enclosed in a recording rack suitable for the recording of film, the recording rack being shown in block in Fig. 3 for purposes of illustration. An optical system, simply illustrated in Fig. 3 at 24, for focusing the images upon a film and a photographic film roll 24; a continuous drive mechanism for transporting the film and other appliances necessary for the operation of the cameras would further be included in the recording rack.

Referring again to Fig. 8 there is shown a series of dots as vertical lines varying in a horizontal plane. This is illustrative of the photographic reproduction as the film is continuously driven. The time reference markers $a'$, $c'$ and $e'$ of J and $g'$ of K appear as a straight line and the time modulated pulses as curving lines $b'$, $d'$, $f'$, $h'$, $i'$ and $j'$. As previously mentioned it is this spacing from which the desired information is computed.

To analyze the various data computed from the time modulated pulses over any given period of time it is necessary that there be incorporated upon the recorded film means for determining elapsed time between any two given points. It is seen on the section of film J of Fig. 8, that the vertical time reference markers are not continuous straight lines but are periodically interrupted. The time between each interruption may be one or two seconds or any predetermined time period from which the elapsed time may be computed.

The manner in which these interruptions are obtained in the preferred embodiment may be seen by again referring to Fig. 3. There is incorporated in the lead wire from inverter 38 to grid 46 of cathode ray tube indicator 40 a cut-out relay 39. It is to be remembered that the counter drive pulses are impressed on grid 46 for the restoration of the time reference markers. Cut out relay 39 is controlled to become operative at periodic intervals of time by timing source 36 which may be a chronometer or any other timing source capable of rendering electrical energy at set periods of time. The electrical energy from timing source 36 then renders cut-out relay 39 operative; removing instantaneously the drive pulses impressed on grid 46.

Although I have shown only certain and specific embodiments of the present invention, it is to be expressly understood that many modifications are possible thereof without departing from the true spirit of the invention.

The invention described herein may be manufactured and used by or for the Government of the United States of America for governmental purposes without the payment of any royalties thereon or therefor.

What is claimed is:

1. A pulse multiplex communication system, comprising means for cyclically transmitting a plurality of time spaced pulses equal to the number of intelligence quantities to be transmitted, means separately controlling the time displacement of each pulse in the plurality from a corresponding reference time position in accordance with a different intelligence quantity, means transmitting a synchronizing signal once during each cycle of pulse transmission; a receiver comprising a time marker generator including a free running oscillator including a sine wave oscillator having an oscillation phase control element therefor operative to produce a series of time reference pulses for establishing a reference time position for each of said time spaced transmitted pulses, means to separate the synchronizing signals from said intelligence pulses and to apply the same to said phase control element to synchronize the oscillator at the receiver in phase with that of the transmitter, separate means to produce an oscillator frequency control voltage responsive to said receiver synchronizing signals and said time reference pulses and apply the same to said sine wave oscillator to synchronize the frequency of the oscillator at the receiver with that of the transmitter, and means for displaying the time relation of the received pulses and their corresponding time reference markers.

2. In a pulse communication system utilizing a recurrent synchronizing signal to control the production of a time base, a time reference marker generator comprising a vacuum tube oscillator having a phase and frequency control element included therein, said phase and frequency control element being responsive to a control voltage applied thereto to control the phase and frequency of the output from the oscillator, means feeding the synchronizing signals to said control element to control the phase of said oscillator output, frequency comparator means operative to combine the synchronizing signal and the output from said oscillator and to derive a control voltage having a magnitude dependent upon the sense and degree of displacement between the synchronizing signals and the oscillator output, and means feeding said control signal to said control element to control the frequency of said oscillator.

3. In a pulse communication system utilizing a recurrent synchronizing signal to control the production of a time base, a time reference marker generator comprising a vacuum tube oscillator having a phase and frequency control element included therein, said phase and frequency control element being responsive to a control voltage applied thereto to control the phase and frequency of the output from the oscillator, means feeding the synchronizing signals to said control element to control the phase of said oscillator output, frequency comparator means operative to combine the synchronizing signal and the output from said oscillator and to derive an output voltage having a magnitude dependent upon the sense and degree of displacement between the synchronizing signals and the oscillator output, rectifier means operative to convert said output voltage to a direct current control signal, and means feeding said direct current control signal to said control element to control the frequency of said oscillator.

4. In a pulse communication system utilizing a recurrent synchronizing signal to control the production of a time base, a time reference marker generator comprising a vacuum tube oscillator having a phase and frequency control element included therein, said phase and frequency control element being responsive to a control voltage applied thereto to control the phase and frequency of the output from the oscillator, means feeding the synchronizing signals to said control element to control the phase of said oscillator output, frequency comparator means operative to combine the synchronizing signal and the output from said oscillator and to derive an output pulse having a magnitude dependent upon the sense and degree of displacement between the synchronizing signals and the oscillator ouput, rectifier means operative to convert said output pulse to a direct current control signal, means feeding said direct current control signal to said control element to control the frequency of said oscillator, and a cut-out circuit operative in the absence of synchronizing pulses to disable said last mentioned means.

5. In a pulse communication system utilizing a recurrent synchronizing signal to control the production of a time base a time reference marker generator comprising a vacuum tube oscillator having a phase and frequency control element included therein, said phase and frequency control element being responsive to a control voltage applied thereto to control the phase and frequency of the output from the oscillator, means feeding the synchronizing signals to said control element to control the phase of said oscillator output, frequency comparator means including a vacuum tube having at least a pair of grid electrodes, means for connecting the output of said oscillator to one of said pair of grid electrodes, means for connecting the synchronizing signals to the other of said pair of grid electrodes, and means to bias said vacuum tube to derive a control pulse therefrom only when the synchronizing signals are applied to said grid electrode, said control voltage having a magnitude dependent upon the sense and degree of displacement between the synchronizing signals and the oscillator output, means feeding said control voltage to said control element to control the frequency of said oscillator.

6. In a pulse communication system utilizing a recurrent synchronizing signal to control the production of a time base, a time reference marker generator comprising a vacuum tube oscillator having a phase and frequency control element included therein, said phase and frequency control element being responsive to a control voltage applied thereto to control the phase and frequency of the output from the oscillator, means feeding the synchronizing signals to said control element to control the phase of said oscillator output, frequency comparator means operative to combine the synchronizing signal and the output from said oscillator and to derive an output voltage having a magnitude dependent upon the sense and degree of displacement between the synchronizing signals and the oscillator output, rectifier means including a pair of integrating vacuum tubes each having at least an anode and a cathode, means for connecting the output voltage derived from the frequency comparator means to the cathode of the first of said pair of integrating vacuum tubes, means for connecting the synchronizing signals to the anode of the second of said pair of integrating vacuum tubes and means for connecting the anode of the first and cathode of the second of said pair of integrating vaccum tubes to a common point, means connecting said common point to said control element to control the frequency of said oscillator.

7. In a pulse communicating system utilizing a recurrent synchronizing signal to control the production of a time base, a time reference marker generator comprising a vacuum tube oscillator having a phase and frequency control element included therein, said phase and frequency control element being responsive to a control voltage applied thereto to control the phase and frequency of the output from the oscillator, means feeding the synchronizing signals to said control element to control the phase of said oscillator output, frequency comparator means operative to combine the synchronizing signal and the output from said oscillator and to derive an output voltage having a magnitude dependent upon the sense and degree of displacement between the synchronizing signals and the oscillator output, rectifier means operative to convert said output voltage to a direct current control signal, a cut-out circuit means including a vacuum tube having at least an anode and a control electrode, rectifier means connecting said synchronizing signals to said control electrode, means to bias said last named vacuum tube to permit conduction only in the absence of said synchronizing signals, circuit means energized by said last named vacuum tube for connecting said direct current control signal, when said synchronizing signals are present, to the control element of said oscillator to control the frequency thereof.

8. A pulse multiplex communication system comprising means for cyclically transmitting a plurality of time spaced pulses equal to the number of intelligence quantities to be transmitted, means separately controlling the time displacement of each pulse in the plurality from a corresponding reference time position in accordance with a different intelligence quantity, means transmitting a synchronizing signal at least once during each cycle of pulse transmission; a receiver comprising a time marker generator operative to produce a series of time reference pulses for establishing a reference time position for each of said time spaced transmitted pulses, means for applying said synchronizing signals to said time marker generator to synchronize it in phase with the transmitter, separate means producing a control voltage in response to the receiver synchronizing signal and time reference pulses and applying said control voltage to said time marker generator to control its frequency, a cathode ray tube indicator having at least a pair of symmetrically disposed deflecting elements and a beam control electrode, sweep generator means connected to the deflecting elements of said cathode ray tube indicator for deflecting its electron beam, a selector control circuit connected to said sweep generator operable in response to one of said time reference marker pulses for initiating the sweep on said cathode ray tube and operable in response to a selectable one of the succeeding time reference marker pulses for terminating the sweep on said cathode ray tube; said selector control circuit including means for selecting the pulse for terminating the sweep; means for connecting said time reference marker pulses and said intelligence pulses to said beam control electrode for displaying the time relation of the intelligence pulses and their corresponding time reference markers.

9. A pulse multiplex communication system comprising means for cyclically transmitting a plurality of time spaced pulses equal to the number of intelligence quantities to be transmitted, means separately controlling the time displacement of each pulse in the plurality from a corresponding reference time position in accordance with a different intelligence quantity, means transmitting a synchronizing signal at least once during each cycle of pulse transmission; a receiver comprising a time marker generator operative to produce a series of time reference pulses for establishing a reference time position for each of said time spaced transmitted pulses, means for applying said synchronizing signals to said time marker generator to synchronize it in phase with the transmitter, separate means producing a control voltage in response to the receiver synchronizing signal and time reference pulses and applying said control voltage to said time marker generator to control its frequency, a cathode ray tube indicator having at least a pair of symmetrically disposed deflecting elements and a beam control electrode, sweep generator means connected to the deflecting elements of said cathode ray tube indicator for recurrently deflecting the electron beam of said cathode ray tube over a common timing locus, a pulse channelizing circuit fed by said time reference generator and operative to produce a separate output pulse for each time reference pulse, a double stability trigger circuit connecting said channeling circuits to said sweep generator and operable in response to one output from said channelizing circuit for initiating the sweep on said cathode ray tube and operable in response to a selectable succeeding output from said channelizing circuit for terminating the sweep on said cathode ray tube; means for selecting the output pulse for terminating the sweep; means for connecting said time reference marker pulses and said intelligence pulses to said beam control electrode for displaying the time relation of the intelligence pulses and their corresponding time reference markers on said timing locus.

10. A pulse multiplex communication system comprising means for cyclically transmitting a plurality of time spaced pulses equal to the number of intelligence quantities to be transmitted, means separately controlling the time displacement of each pulse in the plurality from corresponding reference time position in accordance with a different intelligence quantity, means transmitting a synchronizing signal at least once during each cycle of pulse transmission; a receiver comprising a time marker generator operative to produce a series of time reference pulses for establishing a reference time position for each of said time spaced transmitted pulses, means for applying said synchronizing signals to said time marker generator to synchronize it in phase with the transmitter, separate means producing a control voltage in response to the receiver synchronizing signal and time reference pulses and applying said control voltage to said time marker generator to control its frequency, a cathode ray tube indicator having at least a pair of symmetrically disposed deflecting elements and a beam control electrode, sweep generator means connected to the deflecting elements of said cathode ray tube beam, a pulse channelizing circuit fed by said time reference generator operative to produce a separate output pulse for each time reference pulse, double stability trigger circuit connecting said channelizing circuit to said sweep generator, said double stability trigger circuit being operable in response to certain output pulses from said channelizing circuit for initiating the sweep on said cathode ray tube and operable in response to a selectable other output pulses from said channelizing circuit for terminating the sweep on said cathode ray tube; means for selecting the output pulse for terminating the sweep; means for connecting said time reference marker pulses and said intelligence pulses to said beam control electrode for displaying the time relation of the intelligence pulses and their corresponding time reference markers.

11. In a multiplex communication system operable to transmit a plurality of channel pulses each variably time displaced from a corresponding reference time position, a receiver comprising a time marker generator operative to produce a series of time reference pulses for establishing a time reference position for each of said channel pulses, a cathode ray tube indicator having at least a pair of symmetrically disposed deflecting elements and a beam control electrode, sweep generator means connected to the deflecting elements of said cathode ray tube indicator for deflecting the electron beam thereof, a selector control circuit connected to said sweep generator operable in response to one of said time reference marker pulses for initiating the sweep on said cathode ray tube and operable in response to a selectable succeeding time reference marker pulse for terminating the sweep on said cathode ray tube, means for selecting the marker pulses for controlling the sweep, means for coupling said time reference marker pulses and said intelligence pulses to said beam control electrode for displaying the time relation of the intelligence pulses and their corresponding time reference markers.

12. In a multiplex communication system operable to transmit a plurality of channel pulses each variably time displaced from a corresponding reference time position, a receiver comprising a time marker generator operative to produce a series of time reference pulses for establishing a time reference position for each of said channel pulses, a cathode ray tube indicator having at least a pair of symmetrically disposed deflecting elements and a beam control electrode, sweep generator means connected to the deflecting elements of said cathode ray tube indicator for deflecting the electron beam of said cathode ray tube over a timing locus, a pulse channelizing circuit fed by said time reference generator and operative to produce a separate output pulse for each time reference pulse, a double stability trigger circuit connecting said channelizing circuits to said sweep generator and operable in response to one output from said channelizing circuit for initiating the sweep on said cathode ray tube and operable in response to a selectable succeeding output from said channelizing circuit for terminating the sweep on said cathode ray tube, means for selecting the output pulses for initiating and terminating the sweep, means for coupling said time reference marker pulses and said intelligence pulses to said beam control electrode for displaying the time relation of the intelligence pulses and their corresponding time reference markers on said timing locus.

13. In a multiplex communication system operable to transmit a plurality of channel pulses each variably time displaced from a corresponding reference time position, a receiver comprising a time marker generator operative to produce a series of time reference pulses for establishing a time reference position for each of said channel pulses, a cathode ray tube indicator having at least a pair of symmetrically disposed deflecting elements and a beam control electrode, sweep generator means connected to the deflecting elements of said cathode ray tube beam, a pulse channelizing circuit fed by said time reference generator operative to produce a separate output pulse for each time reference pulse, double stability trigger circuit connecting said channelizing circuit to said sweep generator, said double stabilty trigger circuit being operable in response to given output pulses from said channelizing circuit for initiating the sweep on said cathode ray tube and operable in response to selectable other output pulses from said channelizing circuit for terminating the sweep on said cathode ray tube, means for selecting the output pulse for terminating the sweep, means for coupling said time reference marker pulses and said intelligence pulses to said beam control electrode for displaying the time relation of the intelligence pulses and their corresponding time reference markers.

14. In a pulse multiplex communication system substantially as set forth in claim 11, means for photographically recording the signals displayed on said cathode ray tube, and means for periodically modulating the electron beam of said tube at preset intervals to produce a reference time base on the photographic record.

References Cited in the file of this patent

UNITED STATES PATENTS

| | | |
|---|---|---|
| 2,403,890 | Johnson | July 9, 1946 |
| 2,444,950 | Nichols | July 13, 1948 |
| 2,468,703 | Hammel | Apr. 26, 1949 |
| 2,478,919 | Hansell | Aug. 16, 1949 |
| 2,489,253 | Andre | Nov. 29, 1949 |
| 2,537,056 | Hoeppner | Jan. 9, 1951 |